United States Patent

Santina et al.

[19]

[11] Patent Number: 4,750,454

[45] Date of Patent: Jun. 14, 1988

[54] MANURE DIGESTER AND POWER GENERATING SYSTEM

[75] Inventors: Peter F. Santina, Walnut Creek; Anil K. Chatterjee, Newark, both of Calif.

[73] Assignee: Santina and Thompson, Inc., Concord, Calif.

[21] Appl. No.: 922,795

[22] Filed: Oct. 23, 1986

Related U.S. Application Data

[63] Continuation of Ser. No. 621,223, Jun. 15, 1984, abandoned.

[51] Int. Cl.$^4$ .................... F02B 43/08; F02M 21/02; C12M 1/02
[52] U.S. Cl. ......................... 123/3; 48/111; 210/170; 210/180; 210/232; 210/257.1; 210/532.2; 435/167; 435/316
[58] Field of Search ............. 48/111, 197 A; 435/167, 435/287, 316, 317; 123/3; 210/170, 180, 232, 257.1, 532.2, 614

[56] References Cited

U.S. PATENT DOCUMENTS

| | | | |
|---|---|---|---|
| 1,314,955 | 9/1919 | Flicker | 435/167 |
| 3,591,492 | 7/1971 | Neuspiel | 210/257.1 |
| 3,939,806 | 2/1976 | Bradley | 123/3 |
| 3,968,775 | 7/1976 | Hayman | 123/3 |
| 3,981,800 | 9/1976 | Ort | 430/167 |
| 4,057,401 | 11/1977 | Boblitz | 48/111 |
| 4,166,835 | 9/1979 | Anderson | 435/316 |
| 4,209,303 | 6/1980 | Ricks | 435/316 |
| 4,230,580 | 10/1980 | Dodson | 210/180 |
| 4,274,838 | 6/1981 | Dale et al. | 435/316 |
| 4,372,856 | 2/1983 | Morrison | 210/180 |
| 4,401,441 | 8/1983 | Chase | 48/111 |
| 4,437,987 | 3/1984 | Thornton et al. | 435/316 |

FOREIGN PATENT DOCUMENTS 0051941 5/1982 European Pat. Off. ............ 435/287

*Primary Examiner*—Peter Kratz
*Attorney, Agent, or Firm*—Thomas M. Freiburger

[57] ABSTRACT

A manure digester and power generating system includes a mixing tank for receiving manure, a closed, anaerobic manure digester tank of fixed volume, and a gas-fueled engine and a generator coupled to the engine, for generating electrical power. Manure is scraped into the mixing tank daily, where it is mixed with water to produce a manure slurry of desired consistency, and heated to a prescribed temperature. The digester tank is of fixed volume and may be of a generally rounded cross-sectional shape and elongated in length, and into its inflow end the contents of the mixing tank are transferred daily, on a daily batch basis. Anaerobic-digesting microbes are maintained in the digester tank to digest the manure slurry and produce methane gas and by-products. Temperature in the digester tank is maintained at about 90° to 100° F. Effluent by-products are discharged out the outflow end of the digester tank, and methane gas is drawn off the digester tank and fed to the gas-fueled engine, the exhaust heat from which preferably is used to heat the slurry in the mixing tank.

9 Claims, 8 Drawing Sheets

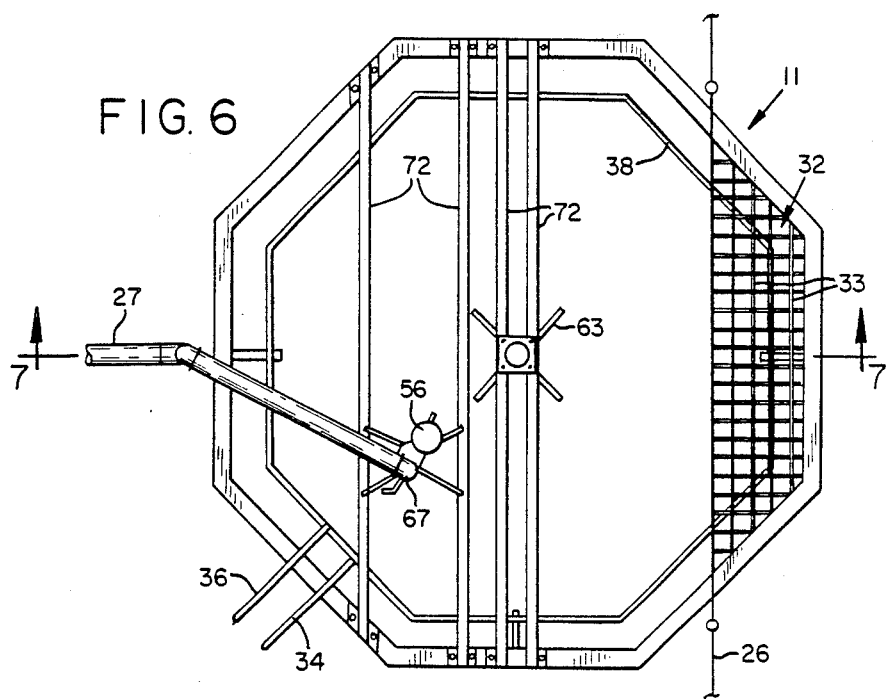
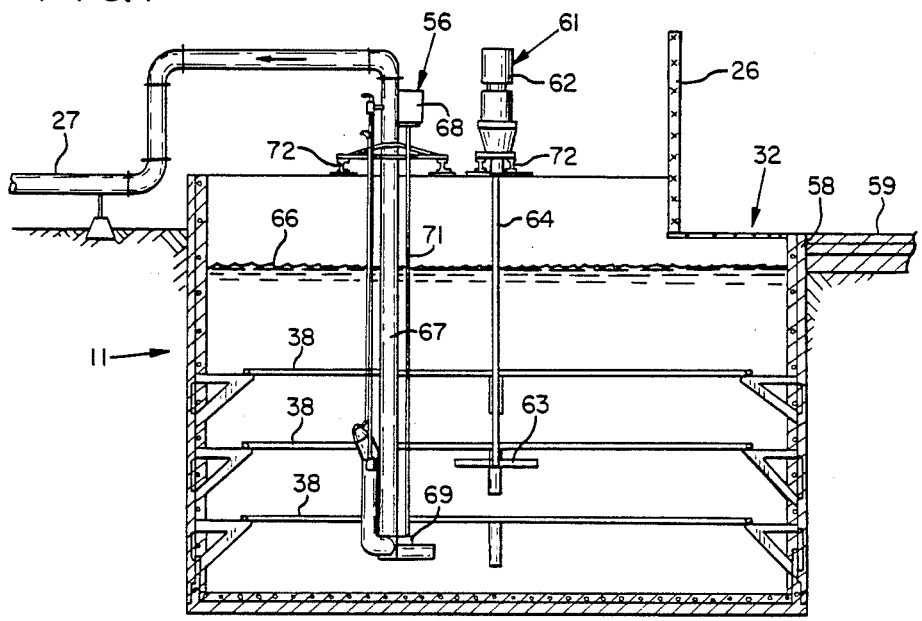
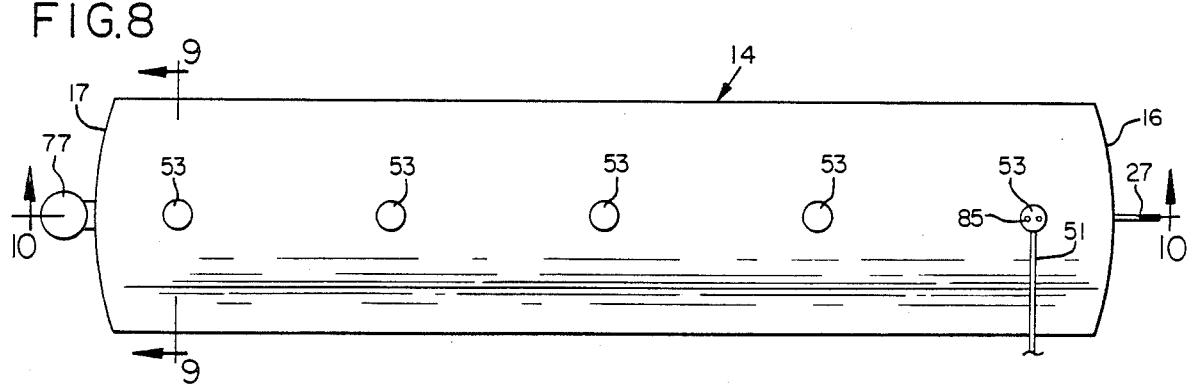

MANURE DIGESTER AND POWER GENERATING SYSTEM

This is a continuation of co-pending application Ser. No. 621,223 filed on June 15, 1984, now abandoned.

BACKGROUND OF THE INVENTION

The invention relates to manure digestion to produce methane gas, which may be used directly for process heat or to fuel an engine/generator to produce electrical power.

The extraction of energy from wastes using anaerobic digestion is old, and the general technology is known. It has been used to treat sewage sludge, and often the resulting biogas has been used to maintain the digester temperature, to run internal combustion engines, etc. Many small units were used in France and Algeria after World War II, and in India and China, many homes and farms have used biogas for everyday activities such as cooking, hot water heating, etc.

Anaerobic digestion is a microbial process involving biochemical decomposition of organic material such as animal manures in the absence of oxygen. It is a two-stage decomposition process. A specific group of microorganisms convert the complex organic matter present in the farm animal manure into methane and other gases. The first stage of this biochemical conversion process produces simple organic acids by acid-forming bacteria. In the second stage, mathane-forming bacteria consume and break down the acids into methane and carbon dioxide gases. Only a properly designed digester can claim to achieve the balance of the two groups of bacteria so that the methane-formers use all the acids produced by the acid-formers. This balancing can only be achieved by controlling the nutrient loading rate, retention time, mixing and temperature.

There are various environmental parameters such as pH, volatile acid concentration, temperature, nutrient availability, heating and heat balance that influence the ability of the bacteria to produce optimum quantities of biogas. Two distinct temperature ranges offer optimum conditions for bacterial growth in the anaerobic digestion process.

The first is mesophilic range, (85° F.–110° F.) and the second is the thermophilic range, (110° F.–150° F.). Although higher biogas production has been reported from digesters operating in the thermophilic range, the active bacteria are more sensitive to environmental conditions than mesophilic bacteria and therefore commercial scale digester control operation becomes too critical. Moreover, considerable energy input is needed to maintain the digester in the thermophilic range.

The mesophilic anaerobic digester of the present invention is structured to maintain the optimum balance between the acid and methane former bacteria and thereby to produce the maximum biogas from the digestion of the animal manures.

Various systems have been suggested for digesting agricultural manure with microbes, collecting methane gas produced thereby, and using the gas to fuel an engine which drives a generator to produce electrical power. Some of these systems have employed expandable covers on manure digester tanks or in-ground troughs, to accommodate variations in volume of gas being produced. See, for example, U.S. Pat. No. 4,274,838. Some have used various means for maintaining desired temperature in the digester tank, for optimum gas production. Often the prior systems were on a batch process, with new manure slurry added on a periodic batch-by-batch basis. Digester tanks of various configurations have been suggested. The waste heat from a methane gas-fueled engine fed by the digestion process has sometimes been used for heating the manure slurry in the digester.

However, none of the prior art systems contemplated or suggested the efficient combination of features of the present invention described below, for optimizing power output in a manure digesting/power generating system which is versatile, reliable and relatively simple in construction and arrangement.

SUMMARY OF THE INVENTION

The manure digester and power generating system of the present invention optimizes gas production by preheating a manure/water slurry of optimum consistency and maintaining the slurry within an optimum temperature range through a plug flow or batch flow digester of fixed volume. Electrical power may be generated using the gas or the gas may be used directly for process heating or other heating purposes at the site, or the gas may be transmitted to other locations.

The system of the invention includes a mixing tank for receiving manure dropped into the tank, with means for mixing water with the manure to produce a manure slurry of desired consistency, and means for heating the slurry in the mixing tank. The heated, mixed slurry is pumped, on a periodic batch-by-batch basis, into a closed, anaerobic digester tank of fixed volume, elongated in length, and free of sharp corners internally, with means for maintaining anaerobic-digesting microbes therein to digest the manure slurry and produce methane gas and by-products. The digester tank is insulated for retention of heat during the digestion process. Effluent solid and liquid by-products are discharged out the outflow end of the digester tank, for use as fertilizer, bedding materials or other uses. The system employs a biogas-fueled engine and a generator coupled to the engine for generating electrical power, and means for drawing off methane gas from the digester tank and conducting it to the engine as fuel.

The mixing tank preferably is efficiently heated by circulation of waste heat from the biogas-fueled engine through the tank, which may be via hot water in pipes passing through the tank and contacting the slurry. For optimum heating efficiency, heat exchange jacket water from the engine is put through a preliminary heat exchanger where it is further heated by the hotter exhaust gas from the engine. The engine jacket water so heated by the exhaust gas, then exchanges heat with cooler mixing tank heat exchanger recirculation water in a second stage shell-and-tube heat exchanger. Temperature is thermostatically controlled by recirculating hot jacket water through the engine radiator before it reaches the second stage exchanger.

The digester system may be for dairy cattle, swine, poultry (chicken, turkey, ducks), or other livestock which lend themselves to collection of manure from one general area. In the case of diary cattle, the manure is scraped daily from alleyways of free stall barns into the mixing tank, which may be open-topped at least at one side, for conveniently receiving the manure. The below-ground mixing tank, may have a liquid capacity holding one day's production of manure. For example, the mixing tank capacity for 500 cows digest system may be about 10,000 gallons. The solids content is adjusted to appropriate slurry consistency required for optimum biochemical conversion mechanism by adding water, the quantity of water depending upon the moisture content of the daily manure.

This manure/water mixture or slurry is thoroughly mixed using a specially designed slurry mixer in the tank. At the same time, the slurry is heated to approximately 95° F. by the heat exchanger in the mixing tank, which preferably utilizes hot water from the gas engine's water jacket, optionally heated further by the engine's exhaust, and circulated directly or indirectly through the mixing tank heat exchanger. When the slurry in the mixing tank has reached 100° F., it is pumped to the digester. A thermostatically controlled switch may be provided to activate a submersible slurry pump in the mixing tank for this purpose. When the slurry level in the mixing tank has dropped to a pre-set level, the slurry pump is automatically switched off, preferably by floating level switches.

According to the invention, cattle and poultry manure or other combinations may be mixed together to optimum proportions and digested in the mesophilic temperature range, 95° F.±5° F. ordinarily used for cattle manure.

The digester employs the known plug flow digestion concept, wherein fresh manure slurry is added daily at one end of an elongated container and digested effluent is removed at the other end. By maintaining a high total solids content above 10% in the digester, mechanical mixing is not required, thus simplifying the digester design for a dairy digester. However, for optimum fermentation and to prevent settlement of organics of poultry manures, a specially designed slow speed agitator may be employed in the digester tank.

The digester tank in one embodiment is constructed of double-walled fiberglass-reinforced-plastic or steel, the walls being spaced apart with insulation between them. The fiberglass or steel digester tank may be about 100 to 110 feet in length, with an ellipitical cross section, the major axis being horizontal, with dimensions, for example, of about 22 feet wide by 12 feet high. Such a digester configuration holds a total liquid volume of about 134,000 gallons with 2 feet of gas space above the liquid level. This results in a 15 to 20 day retention time for 7,000 to 8,000 gallons of slurry loaded daily.

The insulation in the digester tank reduces heat losses so that slurry heated to 100° F., in the mixing tank is maintained at an average temperature of 95° F. in the digester tank, without any heat added on most days. For colder days, a back-up heat exchanger inside the digester may be used to maintain the optimum temperature.

In another embodiment, the digester may be an elongated, poured-in-place concrete through with a maximum length to width ratio of about 4. For example, a 30 foot wide digester tank will have a total length of 120 feet. The digester tank may be provided with a sealed fiberglass-reinforced-plastic or steel cover made up of sections secured together.

When a batch of manure slurry is added to the digester from the mixing tank, the slurry level rises in the digester, and digested manure, called effluent, overflows and exits via a specially designed outlet chamber, below the slurry level in the digester. Effluent flows through the outlet chamber opening while maintaining a gas-tight seal in the interior of the digester. The effluent contains all the nitrogen, phosphorous and potassium of the original manure. If it is de-watered with a screen or screw press or other solids separator, some solids can be used as a fractional feed mix for refeeding to the animals. It has been shown that such digester solids have the same value as alfalfa hay when mixed with fresh feed. The liquid portion of the effluent is an excellent fertilizer, and can be applied to crops through an existing irrigation system or spread by special tank wagon. Digestion has the added benefit of reducing odors from the manure so that if the effluent is stored in a lagoon, it is much less offensive than raw manure.

The biogas produced from anaerobic digestion has about 60% of the heat value of natural gas. The heat value of biogas can be as much as 600 BTU per cubic foot, consisting of about 60% methane, 40% carbon dioxide, and traces of ammonia and hydrogen sulfide. The biogas exits the digester tank through a pipe extending from the top of the digester. Pressure within the digester is controlled by a relief valve mounted near the gas outlet line. The biogas moves through the pipe and through know devices required for handling this type of gas, which may include sedimental and drip tank, flame arrestor and others. In some situations, a pressure storage reservoir for biogas may be required.

The biogas may be used to fuel the engine generator set to produce electricity, or used directly as fuel gas for process heat, in a number of different applications. In many states, public utilities are required to purchase excess electricity from smaller plants on a continuous basis. Thus, no gas storage is required, and waste heat from the continuing operation of the engine may be used to heat the digester and for other heating uses. The electrical generator can be of the induction or synchronous type, suited for interconnection with the local utility. Electricity produced will provide a portion of or all of the needs of the farm, thus reducing the electricity costs of the farming operation, and for periods of low farm use, surplus electricity is sold to the utility.

As mentioned above, the waste heat from the engine preferably is recovered from the water jacket of the engine and used for heating the mixing tank and also the digester, on a back-up basis. Further, according to the invention, waste heat is also recaptured from the higher temperature exhaust gas of the engine.

With the system of the invention, a dairy farm with 500 head is able to generate enough methane to run a 50 to 55 KW engine-generator set 24 hours per day. This electricity may be sold directly to the utility. A greater return is possible if the power produced is used to offset the diary farm's electrical demand. Such an arrangement can provide 90% to 100% of the digester system's heating needs.

It is therefore among the objects of the invention to optimize efficiency, biogas production and electricity production in a manure digester and power generating system, through the use of optimum tank configuration, slurry heating and mixing arrangements, and other important features. These and other objects, advantages, features and characteristics of the invention will be apparent from the following description of a preferred embodiment, considered along with the accompanying drawings.

DESCRIPTION OF THE DRAWINGS

FIG. 6 is a plan view showing the mixing tank in greater detail.

FIG. 7 is a sectional elevation view of the mixing tank, as viewed along the line 7—7 in FIG. 6.

FIG. 8 is a plan view of the digester tank.

DESCRIPTION OF A PREFERRED EMBODIMENT

Figure 1:
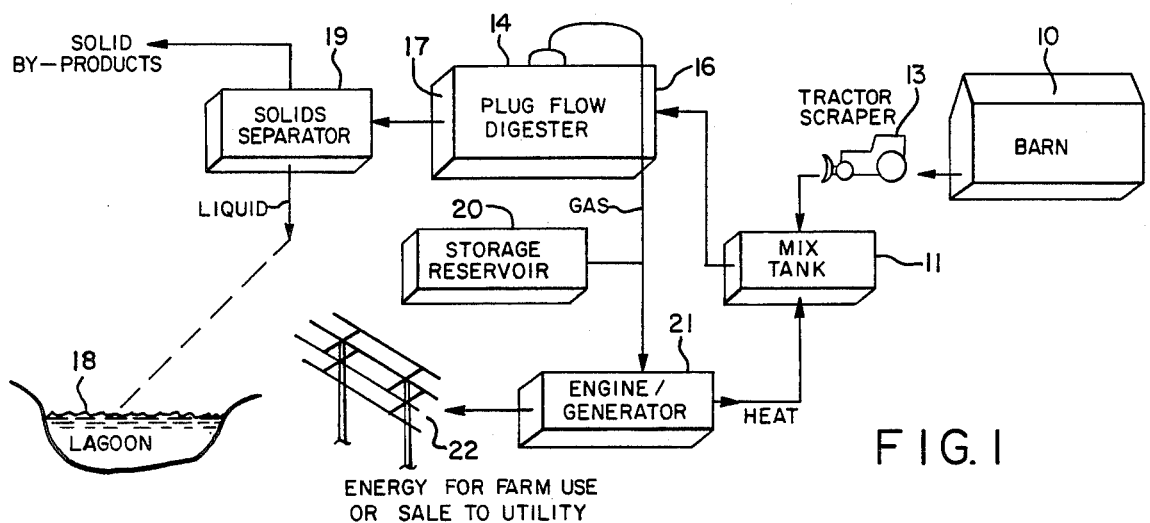
FIG. 1 is a diagrammatic representation in the nature of a flow chart or block diagram indicating the steps and major components of the system of the invention.

In the drawings, FIG. 1 shows diagrammatically the method, apparatus and system of the present invention. The system can be for a dairy farm or for poultry or any other livestock wherein manure can be collected from one general area, but it is described herein specifically with respect to a dairy operation. The only differences between systems for dairy and poultry, for example, are principally in the operating parameters, size of tanks, etc.

Manure is scraped, preferably on a daily batch basis, from a barn 10, a chicken coop or manure alleyway adjacent to where the livestock are fed, into a mixing tank 11. The scraping operation is usually performed with a tractor scraper 13, as indicated in FIG. 1.

In the mixing tank 11, the manure is mixed with water to a prescribed consistency, to about 14% solids, and preheated, preferably to 95° to 100° F. in the case of dairy manure. The heated, mixed slurry is then pumped into a plug-flow digester tank 14, which receives the manure slurry at an inflow end 16, preferably on a daily batch-by-batch basis. The plug flow digester 14 is elongated, so that when the fresh manure slurry is added daily at the inflow end 16, digested effluent exits the outflow end 17. The digested effluent may enter a lagoon 18, as indicated in FIG. 1, or may go directly to a solids separator 19 to have the liquid substantially removed from the solids. The resulting liquids may be sprayed on crops as fertilizer through an irrigation system, or discharged to the lagoon, and the solids may be used as fertilizer, bedding materials or bulk material for feed.

As indicated in FIG. 1, biogas, principally methane gas, is conducted from the digester tank 14 to an engine/generator set 21, which uses the gas as fuel to generate power for farm use and/or putting into the utility power grid 22. For surplus gas storage, a pressure reservoir 20 may be included. Heat from the engine of the engine/generator set 21 is preferably delivered to the mixing tank 11 for preheating of the manure slurry within the tank. Thus, heat otherwise wasted is used efficiently for slurry preheating. It is an important feature of the invention that the manure slurry be preheated in the mixing tank 11, for optimum digestion and production of gas in the digester 14, and the heating is most efficiently accomplished by use of engine heat.

Figure 2:
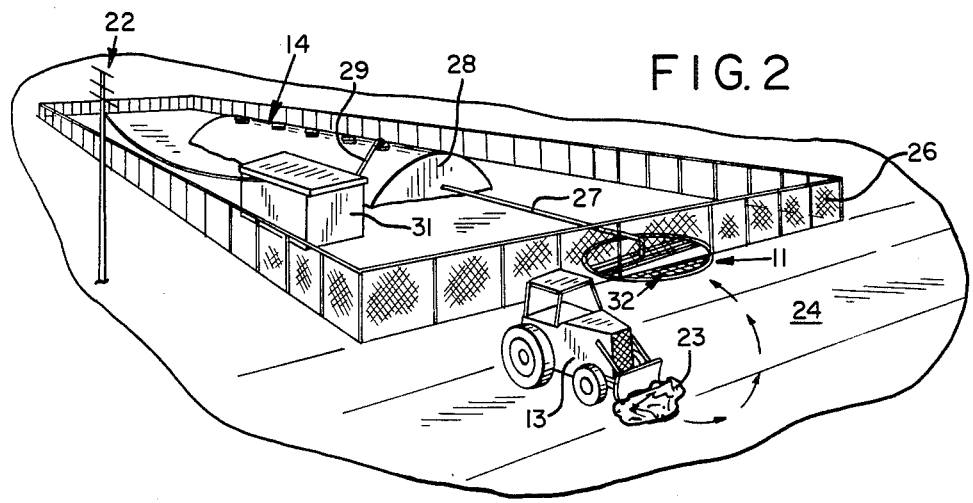
FIG. 2 is a perspective view showing an example arrangement of a diary manure digesting system of the invention.

FIG. 2 shows generally the exterior appearance of some of the components of the manure digester and power generating system of the invention. As illustrated, the tractor scraper 13 scrapes manure 23 from an alleyway 24, which may be of concrete and which is positioned to receive dairy manure dropped by cattle as they are feeding. The manure 23 is scraped and dumped into the mixing tank 11, a portion of which may extend outside a fence 26. The portion of the tank extending outside the fence 26 preferably is open-topped, or with a removable cover (not shown), so that the manure scrapings can conveniently be dumped therein.

The manure slurry mixed and preheated in the mixing tank 11 is conducted via a pipe 27 to the digester tank 28, which preferably may be of an ellipitcal cross-sectional shape, as described and illustrated below, according to one embodiment of the invention. The digester 28 is approximately half below ground, as indicated in the drawing. Biogas produced in the digester 28 by anaerobic digestion collects in the top approximately 2 feet of the digester, under pressure, and flows through a conduit or pipe 29 to the engine/generator 21 housed within a shed 31 as shown. As shown in FIG. 1, the system may include a pressure reservoir 20 for storing surplus gas, particularly when the engine/generator set 21 is shut down.

Figures 3, 4:
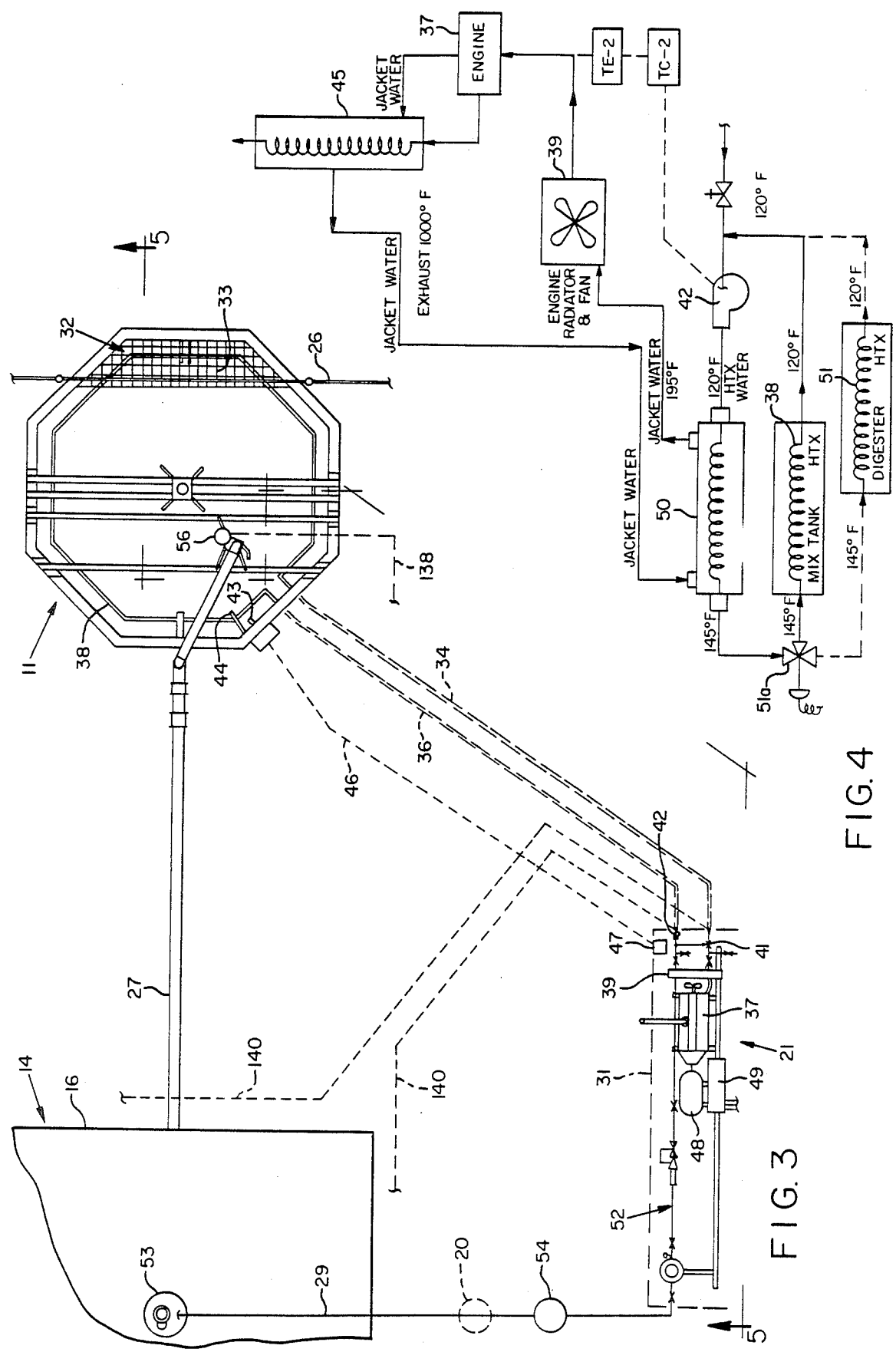
FIG. 3 is a plan view, partially schematic, showing the layout of the mixing tank, the digester tank, the engine-generator set and the interconnection of these components, relative to the system of the invention.
FIG. 4 is a block diagram showing the use of engine exhaust heat to augment the temperature of the water from the engine's water jacket, for heating the manure slurry in the mixing tank.

FIG. 3 shows in plan view, partially schematic, the manure digester and power generating system represented in FIGS. 1 and 2. The mixing tank 11 is shown partially extending beyond the fence 26, with its open portion 32 protected by a steel grid 33. The remainder of the mixing tank 11 may be closed at its top to reduce heat losses, although no cover is shown in FIG. 3. The mixing tank may be octagonal, as shown, to avoid sharp internal corners where material may not mix properly. A rounded shape is optimal, but difficult to form for pouring in place in concrete.

Coolant lines 34 and 36, preferably buried underground, lead from the engine/generator housing 31 to the mixing tank 11, as indicated. There heated coolant from the engine 37, or other liquid which has exchanged heat with the engine coolant, is circulated through one or more heat exchanger pipes 38 arranged generally annularly within the mixing tank 11, at levels wherein they will be submerged in the batch of manure slurry. The mixing tank and heat exchanger 38 are also shown in the elevation views of FIGS. 5 and 7 and the enlarged plan view of FIG. 6.

Referring again to FIG. 3, the heat exchanger conduits 34 and 36 may be connected to the cooling system of the engine 37, which may include a radiator 39 and appropriate valves and pump 41 and 42 for circulating the coolant as required, depending upon temperature within the mixing tank 11. The tank 11 includes a liquid level sensor 43 and a thermocouple sensor 44, connected through wiring in a conduit 46 to a box 47 in the engine/generator housing 31, for control of the pump 42. The pump 42 is set to circulate the coolant liquid to heat the slurry only when the liquid level sensor 43 determines that the slurry is up to the prescribed level, and the thermocouple sensor 44 determines that more heat is required.

According to an important and preferred feature of the invention, the exhaust gas from the engine 37 is also used to heat the slurry. FIG. 4 shows this schematically, with exemplary temperatures. Hot jacket water exits the cooling system of the engine, at about 190° F. It passes through a heat exchanger/silencer 45, where its temperature is boosted by exchange with 1000° F. exhaust gas. It then exchanges heat in a second stage heat exchanger 50 with recirculated mixing tank heater water or other coolant. As FIG. 4 illustrates, the jacket water then passes through the engine's radiator 39 and returns to the engine 37, pumped by the engine's water pump. When the engine has just started and is cold, the jacket water merely follows this path without exchange with the mixing tank or the digester tank. As the temperature of the jacket water increases, this is sensed by a temperature element TE-2, connected to a controller TC-2 which sends a signal to start the pump 42 for circulating water or other coolant through the mixing tank exchanger 38. As indicated, the digester tank may also optionally be heated, on a back-up basis, by a heat exchanger 51 in the digester (see also heat exchange lines 140, FIGS. 3 and 18, discussed below). A solenoid valve 51a controls this function. When no additional heat is needed in the mixing tank or the digester, as sensed by other temperature sensors (not shown), the pump 42 is shut off and the fan of the engine radiator 39 is activated, via an electric clutch (not shown).

As indicated schematically in FIG. 3, the engine 37 drives a generator 48 to produce electrical power, distributed through a box indicated at 49. The engine 37 is powered by biogas conducted to the engine through the conduit 29 and piping, valving and pressure regulating components 52 within the housing 31, from a connection at a manhole riser 53 on the top of the digester tank 14. A gas conditioner 54 may be included along the line 29.

The engine/generator set may, for example, comprise the following: a four-stroke, liquid-cooled, turbocharged engine, No. THD 800-6A manufactured by Minneapolis Moline Corp., coupled with a 125 KVA, 60 Hz generator manufactured by Kato Engineering Co. The generator may be either an induction generator or a synchronous generator, the latter having permanent magnets and producing electricity without any electric power being input to the generator. Safety devices must be employed with a synchronous generator, to shut off power going into the utility power grid during times when the utility power is off. An induction generator automatically cuts off in this situation, since electric power must be input to its coils to generate power.

As also indicated in FIG. 3, heated, mixed slurry is delivered from the mixing tank 11 to the inflow end 16 of the digester 14 through the pipe 27, delivered by a slurry pump 56 within the mixing tank 11.

Figure 5:
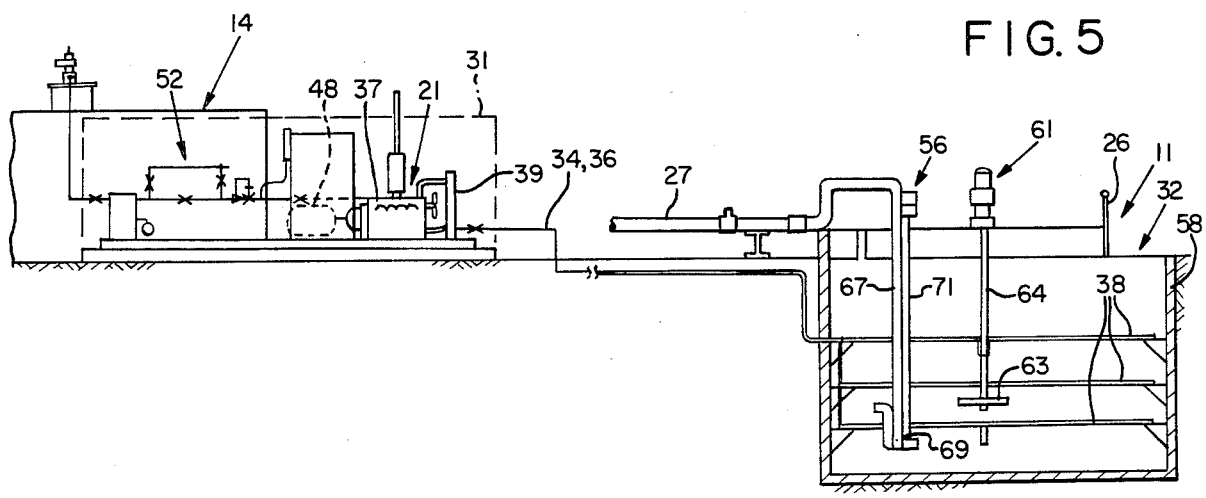
FIG. 5 is an elevation view, partially in section and partially viewed underground, taken generally along the line 5—5 of FIG. 3.

FIGS. 5 through 7 show the mixing tank 11 and related apparatus in greater detail. As indicated in the elevation views of FIGS. 5 and 7, the tank 11 is set almost entirely underground. At the open-topped portion 32, it preferably has a lower wall 58, which may be set flush with a concrete surface 59 for the convenient scraping of manure into the tank. The fence 26 is shown in FIG. 7, acting as a barrier at the inner edge of the open portion 32.

To the manure scraped into the tank 11 is added an appropriate amount of water to reach the desired slurry consistency of about 12% to 15% (or 7%-9% for poultry). A slurry mixer 61 has a motor 62 at the top of the tank and a paddle-type mixing device 63 down in the slurry, rotated by a vertical shaft 64 extending from the motor 62.

The slurry is brought to a prescribed level 66, and heated by the heat exchanger pipes 38 extending around the interior of the tank. Although the heat exchanger pipes 38 are shown in FIGS. 5-7 in a simple horizontal layered arrangement, they may more advantageously be positioned around the tank 11 in vertically convoluted loops as a single continuous tube, so that solids will not tend to settle and collect on the exchanger. The heated mixed slurry, at the proper consistency, is drawn out from near the bottom of the tank via a riser pipe 67 leading to the slurry conduit pipe 27. The slurry is pumped by the pump 56, preferably comprising an upper motor 68 driving a submerged pump 69 via a vertical shaft 71, as shown. As also shown in FIGS. 6 and 7, the slurry mixer 61 and pump 56, riser pipe 67 and associated apparatus may be supported on horizontal beams 72 extending across the top of the mixer tank 11.

Figure 10:
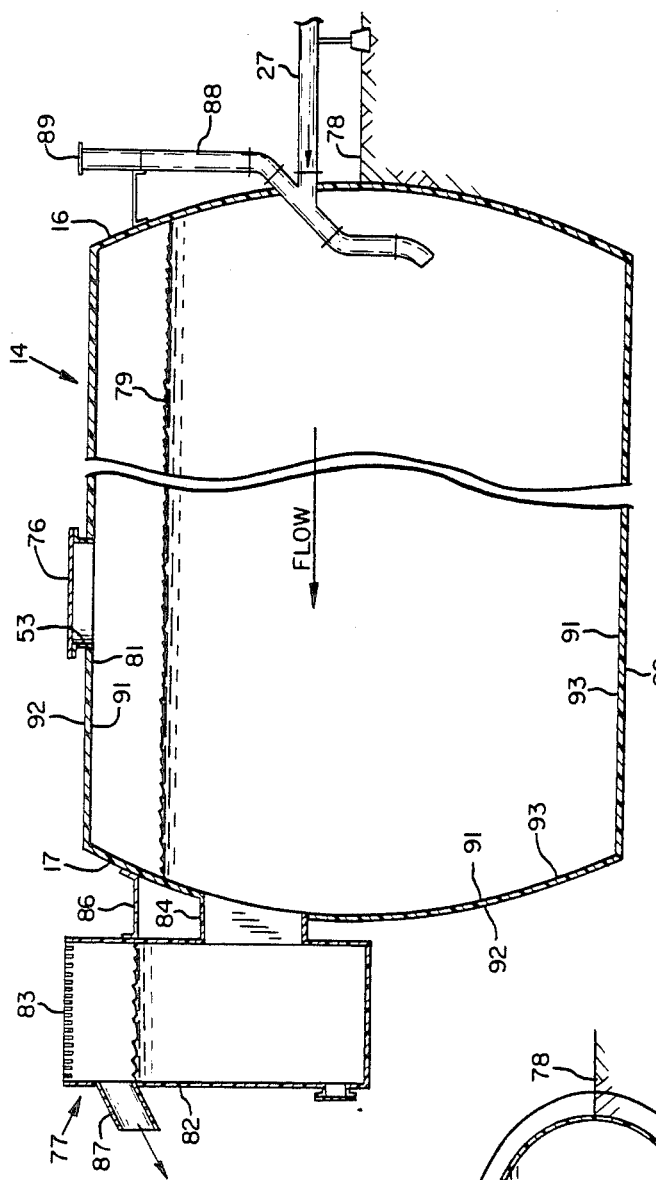
FIG. 10 is a fragmented sectional elevation view of the digester tank, as viewed generally along the line 10—10 in FIG. 8.
Figure 9:
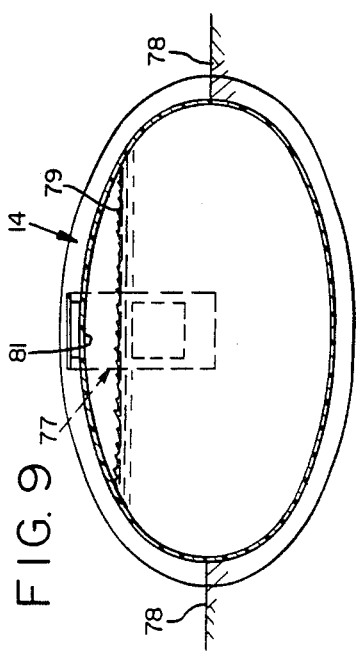
FIG. 9 is a sectional elevation view of the digester tank, as viewed along the line 9—9 in FIG. 8.

FIGS. 8, 9 and 10 show the construction of a first embodiment of the digester tank 14. FIG. 8 shows in plan view that the fiberglass-reinforced-plastic or steel tank is elongated, having a much greater length than its width, principally to accommodate the plug flow digestion concept as discussed above. The inflow end 16 and the outflow end 17 are preferably convexly rounded, as indicated in FIGS. 8 and 10. If the tank is of steel, it preferably is fabricated from corrugated sheet steel.

The digester tank 14 preferably includes a series of manholes 53 on its top, fitted with metal covers 76 (FIG. 10). Manure slurry enters the inflow end 16 of the digester via the conduit pipe 27, and the digested effluent leaves the outflow end of the digester via an effluent overflow outlet box 77.

As shown in FIG. 9, the digester tank 14 is most advantageously formed in an oval or elliptical shape, with the major axis horizontal, and may be positioned halfway below the level of the exterior grade 78. The elliptical cross-sectional configuration is strong, efficient from a storage volume standpoint, and is devoid of "dead spaces" wherein manure slurry could be trapped without full digestion and progressive daily movement along with the remainder of the slurry. The slurry level 79 is indicated in FIG. 9, preferably about two feet below the top center 81 of the digester tank 14.

In FIG. 10, a fragmented, shortened elevational section view of the digester tank 14, the effluent overflow box 77 at the outlet end 17 of the digester 14 is shown in greater detail. It comprises a manhole 82 with a cover 83, connected to the end 17 of the tank 14 by a large outlet conduit 84 and a structural brace member 86. The manhole 82 preferably has an outflow weir 87, through which the digested slurry exits to a lagoon 18 or solids separator 19 (see Fig. 1). As illustrated, the slurry level at the outflow spout 87 is somewhat higher than the level in the digester's interior, because of the pressurized gas in the space above the slurry in the digester tank. The gas preferably is under pressure of about nine inches water head, limited by a relief valve 85 (FIG. 8).

At the inflow end 16 of the digester tank 14, the slurry delivery pipe 27 is shown, carrying raw slurry pumped from the mixing tank, and connected to a cleanout pipe 88 extending upwardly to about the level of the tank top, and covered by a removable cap 89.

The digester tank may be of a double-walled fiberglass construction, connected together in several sections through the length of the tank, with inner and outer walls 91 and 92 of fiberglass reinforced plastic, and with several inches of insulation 93 sandwiched between the walls. Additional insulation may be sprayed onto the outside of the exterior wall 92, to provide still better insulation and heat retention in the tank 14. As mentioned above, the tank 14 may alternatively be of corrugated steel, again double-walled and insulated.

FIGS. 11–16 show another embodiment of a digester 100, comprising a poured-in-place concrete trough 101 with a fiberglass-reinforced-plastic or corrugated steel cover 102 connected to the trough in sealed relationship to form a closed, fixed-volume digester tank. The concrete trough digester is preferred in the case of subsoil conditions which do not permit excavation to a 16 or 18 foot depth, or conditions wherein subsurface water is so pervasive that the fiberglass digester tank 14 would tend to float up.

Figure 11:
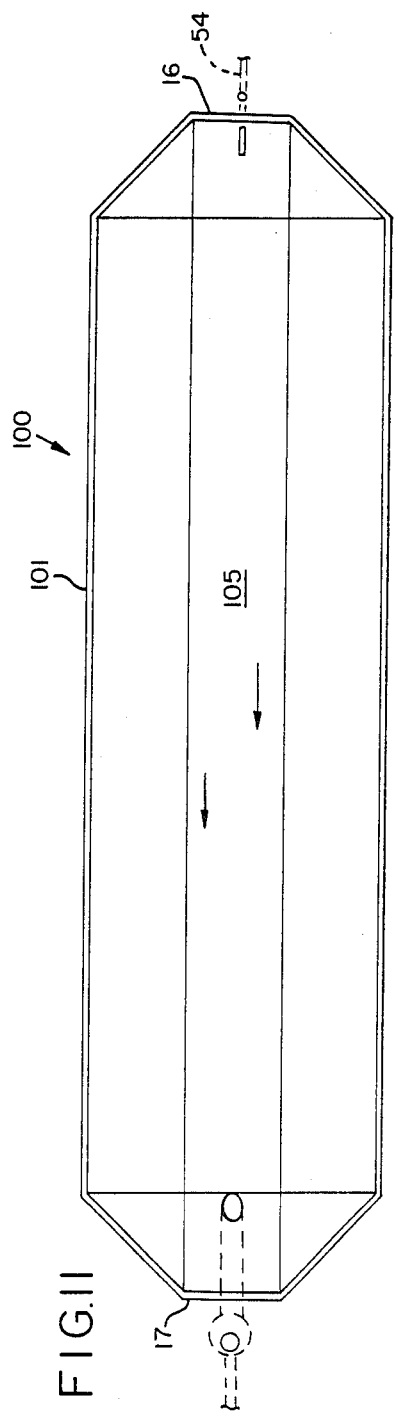
FIG. 11 is a plan view showing an alternate form of digester tank.
Figure 12:
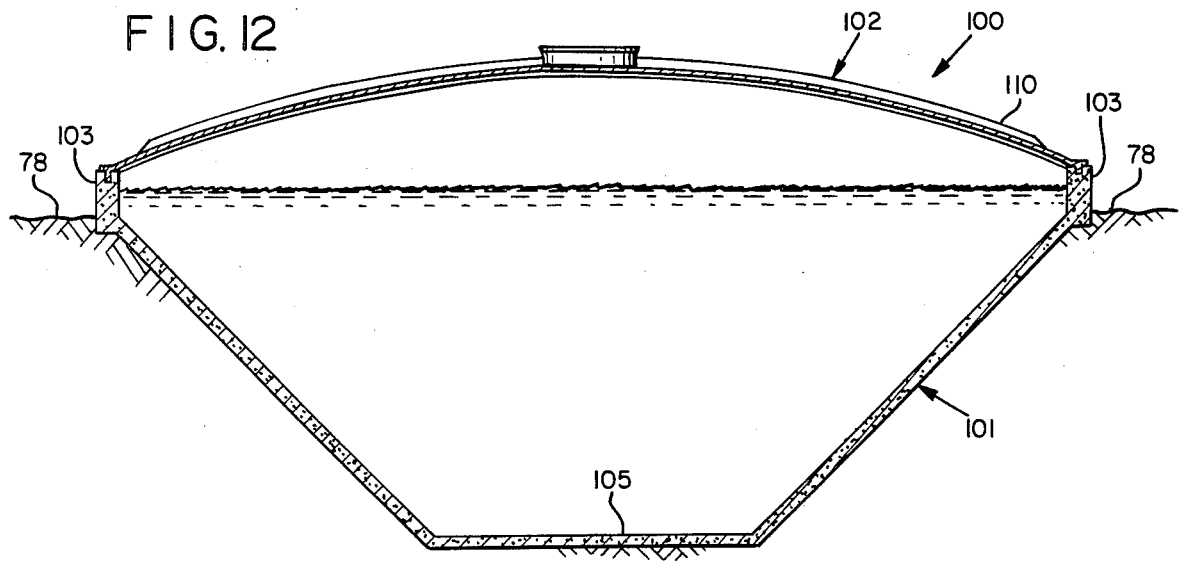
FIG. 12 is a partially diagrammatic sectional view of the digester tank of FIG. 11.

As indicated in FIGS. 11 and 12, the concrete trough 101 preferably is formed with planar surfaces, for economy of forming, but without sharp internal corners which could cause "dead spaces" as discussed above. In FIG. 12 it is illustrated that the digester tank 100 may be mostly below grade 78, with the concrete trough 101 including a grade beam 103 to which the cover 102 is secured. The bottom 105 of the concrete trough preferably slopes from the influent end 16 toward the effluent end 17, and the slope may be about 1%. This is an important feature of the tank design, in assisting the flow of slurry along the bottom toward the effluent end, and especially in assuring that settled solids on the bottom progress toward the effluent end.

Figure 13:
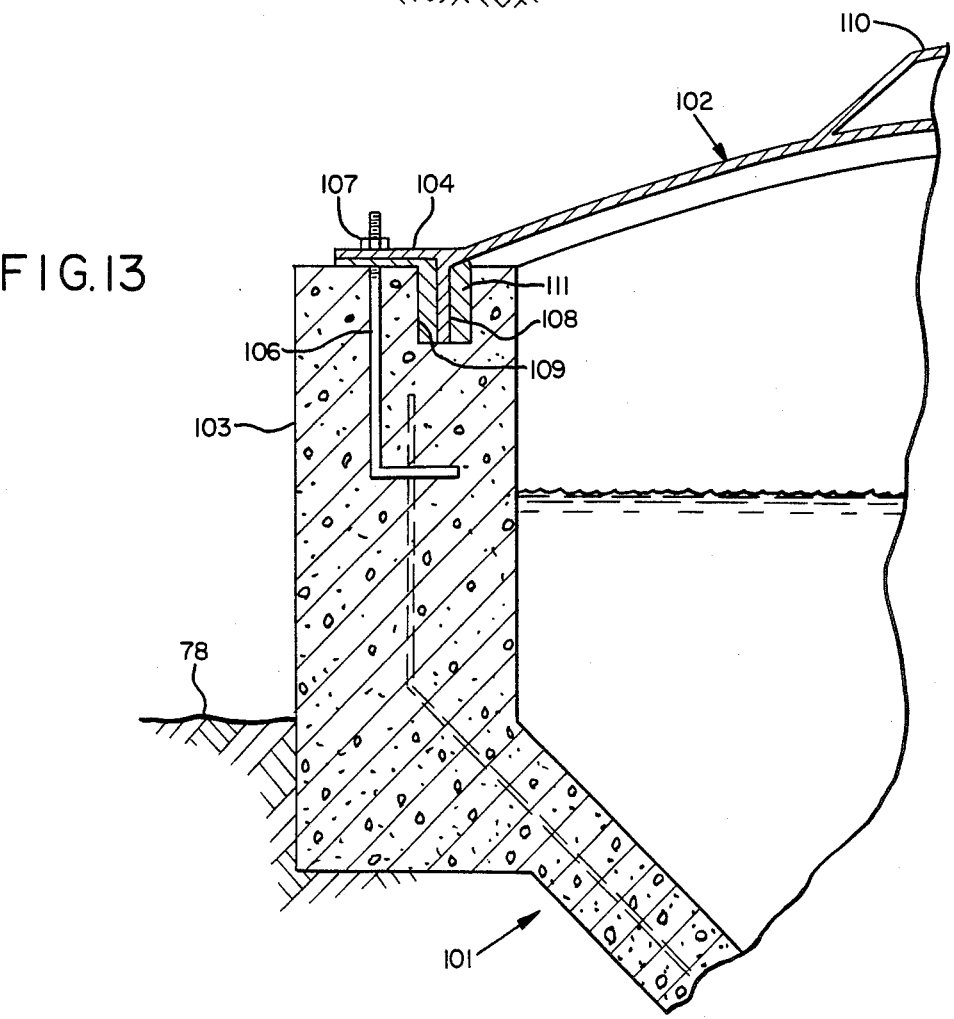
FIG. 13 is an enlarged, detail sectional view showing a portion of the structure of the digester tank of FIG. 11.

FIG. 13 shows the connection of the preferably fiberglass cover 102 to the grade beam 103 in greater detail. As indicated, the fiberglass cover 102 is connected in sealing relationship to the grade beam 103 by bolting of a horizontal flange 104 of the cover to the grade beam via a threaded stud 106 set into the concrete, with a nut 107. A vertical flange 108 of the cover extends down into a channel or recess 109 in the grade beam, and sealing is preferably accomplished by silicon sealer or other elastomeric sealer 111.

In this embodiment of the invention, the level of the slurry along the midline of the digester tank may be about three to four feet below the cover 102.

Figure 14:
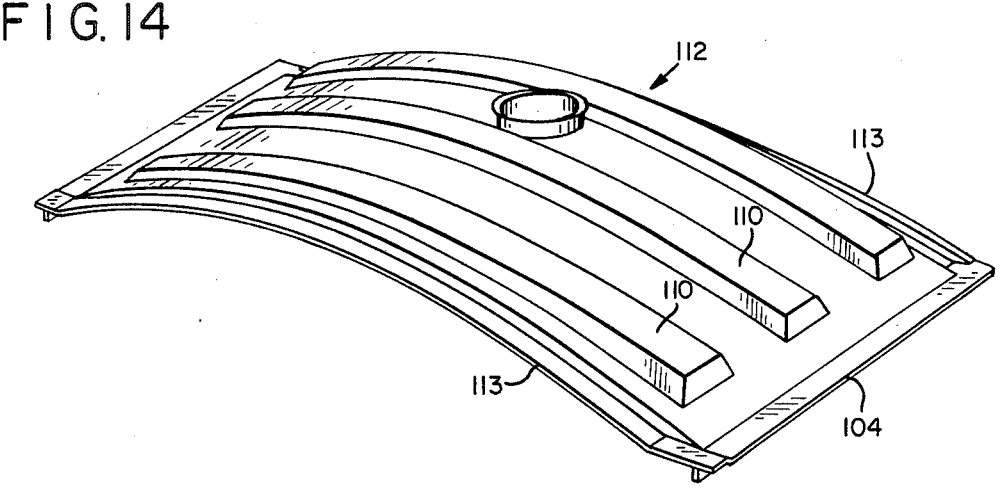
FIG. 14 is a perspective view showing a cover section of the digester tank of FIG. 11.
Figure 15:
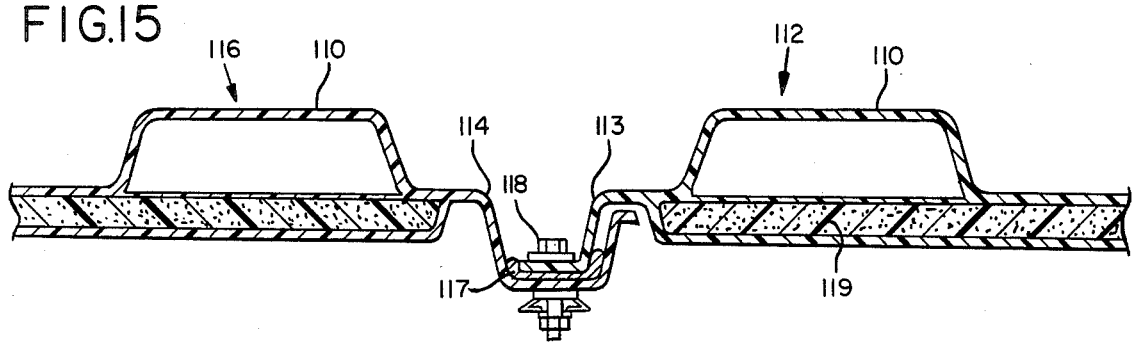
FIG. 15 is a detail sectional view showing the manner in which two adjacent cover sections are connected.
Figure 16:
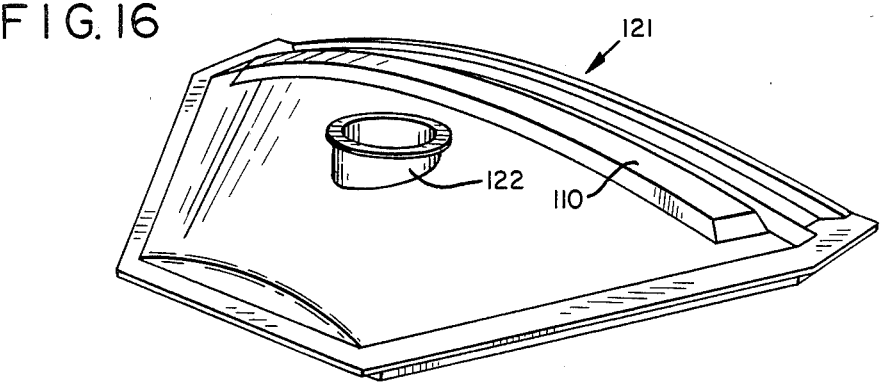
FIG. 16 is a perspective view showing a special cover section as occurs at the ends of the digester tank of FIG. 11.

FIGS. 14, 15 and 16 show in greater detail the structure of the cover 102, which is in bolted-together sections. FIG. 14 shows one of the main sections 112, corrugated as shown for strength with corrugations or ribs 110. Each cover section has either a "male" or "female" transverse edge configuration for securing to the next adjacent cover section, which is of the opposite edge configuration. The cover section 112 shown in FIG. 14 is of the male configuration, with both transversely extending edges 113 being the same. FIG. 15 shows the edge 113 of a male cover section 112 secured to the edge 114 of an adjacent female cover section 116. The two edges 113 and 114 are sealed by means of a strip of silicon or elastomeric sealant 117 between them, compressed by a series of bolts or other suitable fasteners 118.

By having "male" and "female" sections, each of which has two identical edges, either both male or both female, it is possible to gain access to the interior of the digester tank by simply removing one male cover section. To this end, the fasteners 118 should be accessible for removal from the outside, and replaceable from the outside alone.

As also shown in FIG. 15, the cover sections 112 and 116 preferably include insulation 119 for helping maintain the desired temperature in the digester tank for anerobic digestion. The concrete trough 101 itself also acts as an insulator.

FIG. 16 shows a generally trapezoidally shaped end cover 121, one of which is secured at each end of the digester tank 100. The sections 121 are secured to the concrete trough 101, i.e. the grade beam 103, in the same manner as shown for the longitudinal edges of the main cover sections in FIG. 13. As illustrated in FIG. 16, the end cover sections 121 may include a manhole 122 for access.

Figure 17:
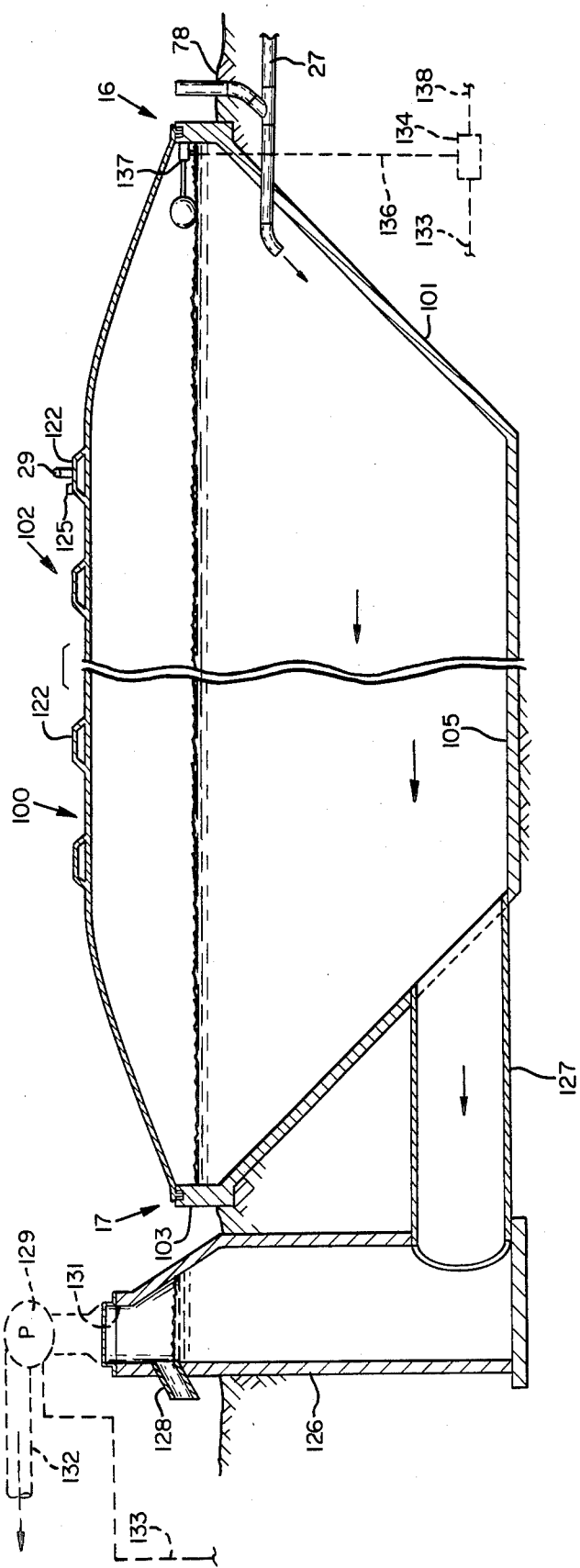
FIG. 17 is a fragmented, partially schematic view in side elevation of the digester tank.

FIG. 17 shows, partially schematically and fragmented in length, the concrete-trough digester tank 100, in side elevation. This view is similar to FIG. 10, which illustrated the fiberglass or steel tank of the first embodiment. As indicated in FIG. 17, the slurry delivery pipe 27 from the mixing tank enters the inflow end 16 of the concrete trough 101 below the slurry level, and a capped cleanout pipe assembly 88 extends up from the pipe 27 as in the previously described embodiment, terminating above-ground as shown.

A series of covered manholes 122 may be included along the length of the cover 102, in some of the corrugated fiberglass or steel sections making up the length of the cover 102, shown schematically in FIG. 17. From one manhole 122 the gas delivery line 29 leads to the engine/generator set, as described previously, and the same manhole or the pipe 29 may include a flame-arrested relief valve 125, for maintaining the desired pressure (about 9" water) in the digester tank.

At the effluent end 17 of the digester tank 100 is a stovepipe type effluent overflow structure 126, which may comprise a cast eccentric manhole as shown (or a metal or fiberglass manhole). This structure is connected to the effluent end of the concrete trough 101 by a horizontal connector pipe 127 which may be of about three-foot diameter, entering at the tank bottom 105 as shown. The pipe 127 may continue the same slight downward slope (preferably about $\frac{1}{2}°$) as the trough bottom 105. In connection with the downward slope of the trough bottom, the stovepipe design and low connector pipe, at the trough bottom, form a swept-bottom design and assure efficient outflow of settled solids from the bottom of the digester tank. The effluent overflow structure 126 has a weir or overflow pipe 182, in the event the effluent liquid/solid slurry is to be discharged into a lagoon. However, if the effluent slurry is to be put through a solids separator (see water separator 19 in FIG. 1), with the advantages discussed above, then a suction pump 129 (dashed lines) may be connected to the top opening 131 in a sealed connection. From the pump 129, which may be a centrifugal pump, a discharge conduit 132 leads toward a solids separator.

The operation of the pump 129, if included, is automatically controlled by timer or float, with its operation coordinated with the operation of the mixing tank pump 56 (FIGS. 3, 5 and 6). The rate of effluent withdrawal from the stovepipe effluent structure is maintained approximately equal to the pumping rate of the slurry pump. A single pump can be designed to serve multiple digesters. Electric wiring 133 is shown schematically in FIG. 17, leading from the pump 129 to a control box 134, which in turn is connected by wiring 136 to a float level sensing device 137 (or other appropriate electronic or mechanical level sensing device) and by wiring 138 to the mixing tank pump 56 (see FIG. 3).

It should be understood that the pump 129 and associated components just described can be employed in connection with the steel or fiberglass digester tank 14 and overflow box 77 of the first described embodiment of FIGS. 8-10, in the event a solids separator is to be used with that digester tank.

Figure 18:
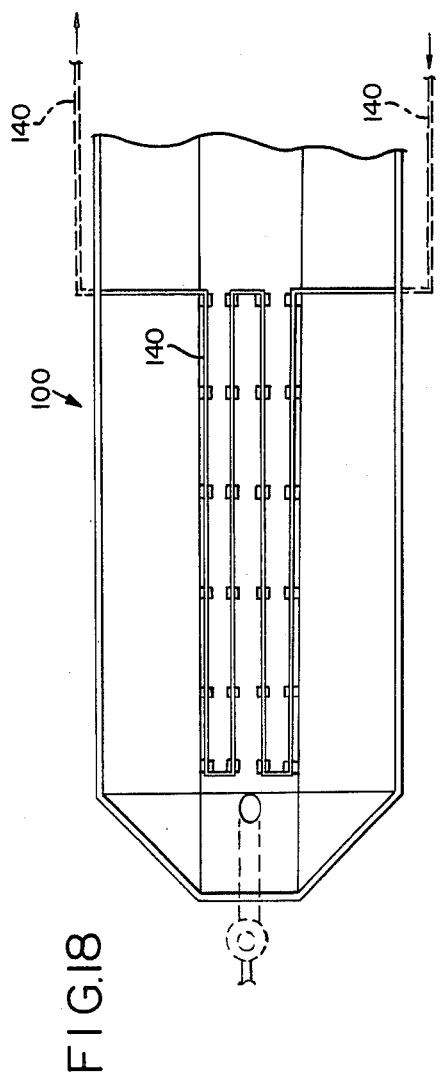
FIG. 18 is a schematic, partial plan view showing an arrangement of heat exchanger pipes in the digester tank.

FIG. 18 shows in schematic representation a layout of a heat exchanger line 140 in the digester tank 100, for a back-up heating arrangement as discussed above. Heat is circulated through the looped line 140 from the water jacket of the engine 39 (FIG. 3), when outside temperatures are too low for the insulated digester tank 100 to maintain the required temperature in the slurry, which has been preheated in the mixing tank 11. Normally, when the mixing tank is being emptied, the hot water will be recirculated through the digester heat exchanger tubes 140. The arrangement shown is merely exemplary, and a similar or modified arrangement may be used in the digester tank 14 of the first-described embodiment.

Figure 19:
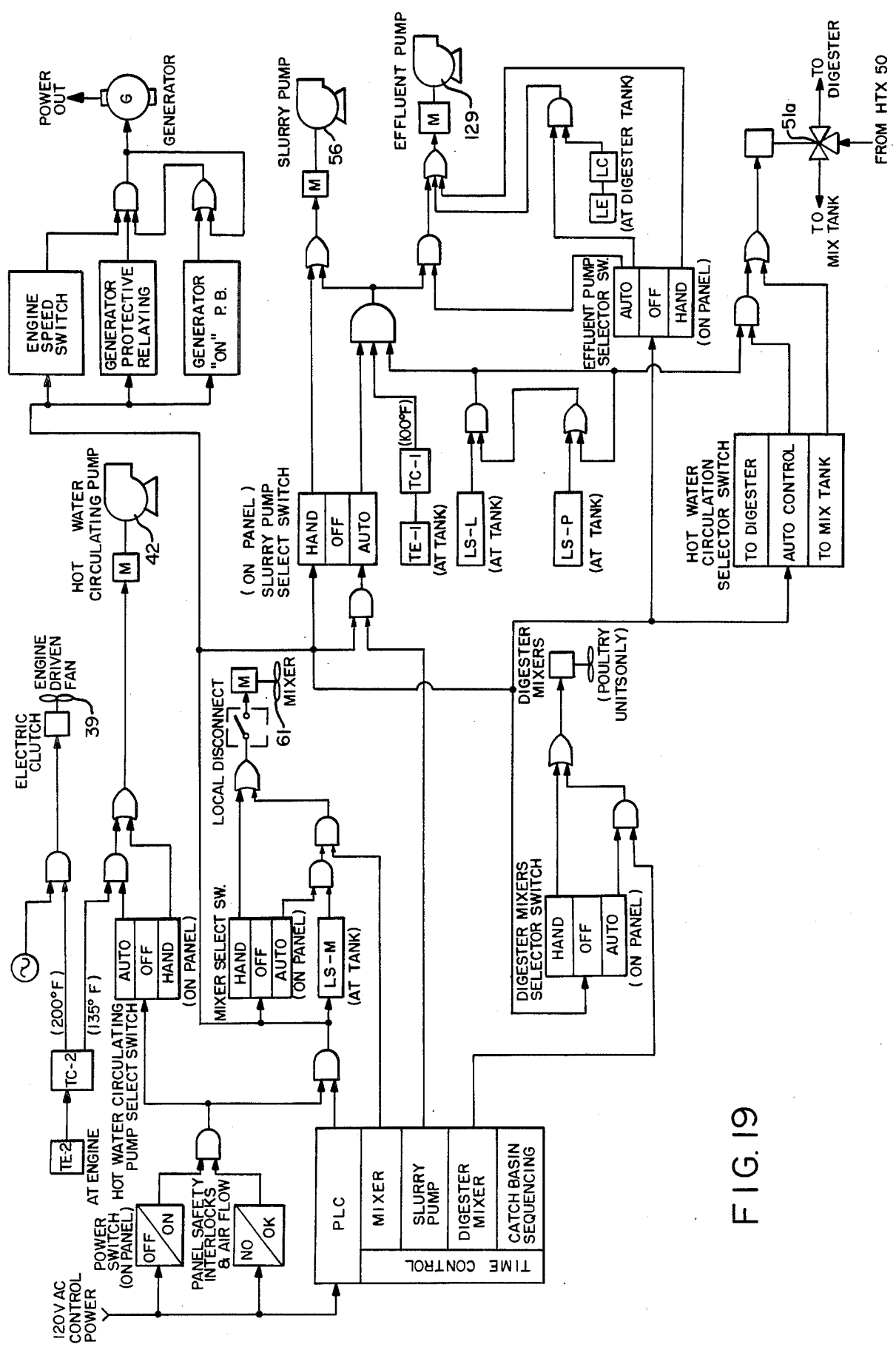
FIG. 19 is a schematic logic diagram showing a control system by which the system of the invention may be operated.

FIG. 19 is a schematic logic diagram illustrating control of the manure digesting and power generating system of the invention, by a programmable logic control (PLC). In FIG. 19, the following symbols are used for control components:

TE = Temperature Element (sensor)
TC = Temperature Control
LS = Level Switch
LS-M = Level Switch to control Mixer
LS-L = Level Switch—Low Level
LS-P = Level Switch—operate Pump
LE = Level Element (sensor)
LC = Level Control
M = Motor As indicated in FIG. 19, mixing of the manure slurry in the digester tank may be required for poultry manure, although not for dairy manure. The digester mixers are only included in poultry digester systems.

Control of all major components may be manual when necessary or desirable, as indicated in FIG. 19. Normally, control of these components is automatic, under control of the PLC.

The preferred embodiment described herein is intended to be purely illustrative and not limiting of the scope of the invention. Other embodiments and variations will be apparent to those skilled in the art and may be made without departing from the essence and scope of the invention as defined in the following claims.

What is claimed is:

1. A manure digester and power generating system, comprising:

a mixing tank for receiving manure, and for mixing water with the manure to produce a manure slurry of desired consistency;

a closed anaerobic digester tank of fixed volume, elongated in length, having an inflow end and an outflow end, and means for maintaining anaerobic-digesting microbes therein to digest the manure slurry and produce biogas and by-products, with insulation means for retaining heat in the digester tank;

the mixing tank being separate from and spaced from the digester tank;

pumping and conduit means for transferring the contents of the mixing tank to the digester tank, through the inflow end, on a periodic batch-by-batch basis;

automatic control means, associated with the pumping means, for monitoring and controlling temperature and volume of the contents of the mixing tank before transfer to the digester tank;

means for discharging effluent by-products out the outflow end of the digester tank;

a gas-fueled engine and a generator coupled to the engine, for generating electrical power;

heater means, associated with the engine and the mixing tank, for heating the manure slurry in the mixing tank to a temperature sufficient for anaerobic digestion;

the heater means including means for cooling the engine with liquid coolant and for circulating the coolant in order to effect heat exchange from the hot coolant to the manure slurry in the mixing tank;

and the heater means further including a separate heat exchanger outside the engine and the mixing tank, for taking waste heat from the engine's high-temperature exhaust and using it to boost the temperature of the coolant much higher than its temperature in the engine, before the coolant is circulated to the mixing tank;

means for drawing off biogas from the digester tank and for conducting it to the engine as fuel, and wherein the manure slurry is heated sufficiently, prior to introduction into the digester tank and separately from the digester tank, to prevent temperature shock of already digesting slurry in the digester tank when the slurry is introduced into the digester tank.

2. The system of claim 1, further including digester heating means associated with said heat exchange means, for heating the slurry in the digester tank by heat exchange with said liquid coolant, when required.

3. The system of claim 1, wherein at least a portion of the top of the mixing tank is open, the system including cattle manure alleyways adjacent to the open portion, so that manure can be scraped into the mixing tank efficiently.

4. The system of claim 1, wherein the digester tank comprises a poured-in-place concrete trough and a cover comprising a series of outwardly convex rigid cover sections, means securing and sealing the cover sections together, and means securing and sealing the cover sections to the concrete trough.

5. The system of claim 4, wherein the effluent overflow structure includes an above-ground overflow weir for discharging effluent slurry to a lagoon.

6. The system of claim 4, including a stovepipe-type effluent overflow structure oriented vertically adjacent to the outflow end of the concrete trough, and a horizontal connector pipe connecting the lower end of the overflow structure to the concrete trough at its bottom, such that the bottom of the connector pipe is substantially aligned with the bottom of the concrete trough, for efficient outflow of settled solids from the bottom of the digester tank.

7. The system of claim 6, further including an effluent pump connected at its suction side to an opening in the effluent overflow structure to draw effluent liquid-solid slurry, and a solids separator connected to the pressure side of the pump for separating the liquids from the solids for beneficial uses of both, and means for coordinating the operation of the effluent pump with the entry of batches of manure slurry from the mixing tank for maintaining a substantially constant level of slurry in the digester tank.

8. The system of claim 4 wherein the rigid cover sections include insulation means for retaining heat in the digester tank.

9. A manure digester and power generating system, comprising:

a mixing tank for receiving manure, and for mixing water with the manure to produce a manure slurry of desired consistency;

a closed anaerobic digester tank of fixed volume, elongated in length, having an inflow end and an outflow end, and means for maintaining anaerobic-digesting microbes therein to digest manure slurry and produce biogas and by-products, with insulation means for retaining heat in the digester tank, the digester tank comprising a poured-in-place concrete trough and a cover comprising a series of outwardly convex rigid cover sections, means securing and sealing the cover sections together, and means securing and sealing the cover sections to the concrete trough;

the mixing tank being separate from and spaced from the digester tank and at least a portion of the top of the mixing tank being open, the system including cattle manure alleyways adjacent to the open portion, so that manure can be scraped into the mixing tank efficiently;

pumping and conduit means for transferring the contents of the mixing tank to the digester tank, through the inflow end, on a periodic batch-by-batch basis;

automatic control means, associated with the pumping means for monitoring and controlling temperature and volume of the contents of the mixing tank before transfer to the digester tank;

means for discharging effluent by-products out the outflow end of the digester tank;

a gas-fueled engine and a generator coupled to the engine, for generating electrical power;

heater means, associated with the engine and the mixing tank, for heating the manure slurry in the mixing tank to a temperature sufficient for anaerobic digestion;

the heater means including means for cooling the engine with liquid coolant and for circulating the coolant in order to effect heat exchange from the hot coolant to the manure slurry in the mixing tank;

and the heater means further including a separate heat exchanger outside the engine and the mixing tank, for taking waste heat from the engine's high-temperature exhaust and using it to boost the temperature of the coolant much higher than its temperature in the engine, before the coolant is circulated to the mixing tank;

means for drawing off biogas from the digester tank and for conducting it to the engine as fuel; and wherein the manure slurry is heated sufficiently, prior to introduction into the digester tank and separately from the digester tank, to prevent temperature shock of already digesting slurry in the digester tank when the slurry is introduced into the digester tank.

* * * * *